United States Patent
Gapin et al.

(10) Patent No.: US 11,698,453 B2
(45) Date of Patent: Jul. 11, 2023

(54) ENVIRONMENT SCANNING USING A CELLULAR NETWORK

(71) Applicant: T-Mobile USA, Inc., Bellevue, WA (US)

(72) Inventors: Andrew Gapin, Seattle, WA (US); Paul Bongaarts, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 489 days.

(21) Appl. No.: 16/872,764

(22) Filed: May 12, 2020

(65) Prior Publication Data

US 2021/0356582 A1  Nov. 18, 2021

(51) Int. Cl.
*G01S 13/89* (2006.01)
*G01S 7/00* (2006.01)
*G01S 13/00* (2006.01)
*H04W 84/04* (2009.01)
*H04W 88/02* (2009.01)

(52) U.S. Cl.
CPC ............. *G01S 13/89* (2013.01); *G01S 7/006* (2013.01); *G01S 13/003* (2013.01); *H04W 84/042* (2013.01); *H04W 88/02* (2013.01)

(58) Field of Classification Search
CPC ...... G01S 5/0284; G01S 5/0252; G01S 13/89; G01S 5/0221; G01S 5/0205; G01S 2205/008; G01S 5/0273; G01S 5/0036; G01S 5/0009; G01S 5/0018; G01S 5/0054; G01S 11/06; G01S 5/06; G01S 7/292; G01S 5/0045; G01S 5/14; G01S 5/02521; H04W 24/10; H04W 24/04; H04W 4/029; H04W 64/00; H04W 24/02; H04W 4/02; H04W 16/20; H04W 28/0236; H04W 40/246; H04W 12/79; H04W 16/18; H04W 24/08; H04W 4/38; H04W 40/24; H04W 40/248; H04W 72/542; H04W 13/89; H04B 17/318; H04B 17/391; H04B 17/27
See application file for complete search history.

(56) References Cited

U.S. PATENT DOCUMENTS

| | | | | |
|---|---|---|---|---|
| 6,298,233 B1* | 10/2001 | Souissi | ................ | H04W 24/00 455/423 |
| 9,775,121 B1* | 9/2017 | Cai | ...................... | H04L 5/0048 |

(Continued)

*Primary Examiner* — Olumide Ajibade Akonai
(74) *Attorney, Agent, or Firm* — Lee & Hayes, P.C.

(57) ABSTRACT

A cellular network system and method provided herein are directed to generating an area topographic map of a surrounding area of the cellular network system. The cellular network system comprises a transmitter, a receiver, memory, and one or more processors (processors) communicatively coupled to the transmitter, the receiver, and the memory. The memory stores computer-executable instructions that, when executed by the processors, perform certain operations. The transmitter transmits in a target direction a first signal, which is a communication signal intended for a user equipment (UE) and the receiver receives a second signal. The processors determine whether the second signal is a reflected signal associated with the first signal, determine topographic data associated with the surrounding area of the cellular network system in the target direction based at least in part on the second signal, and generate the area topographic map of the surrounding area based on the topographic data.

17 Claims, 7 Drawing Sheets

(56) References Cited

U.S. PATENT DOCUMENTS

| | | | |
|---|---|---|---|
| 10,542,504 B1* | 1/2020 | Liu | H04W 52/283 |
| 10,718,863 B2* | 7/2020 | Carswell | G01S 13/93 |
| 11,115,833 B1* | 9/2021 | Dennis | H04W 16/26 |
| 2016/0327634 A1* | 11/2016 | Katz | G01S 7/4008 |
| 2017/0134909 A1* | 5/2017 | Gu | H04B 17/318 |
| 2019/0123797 A1* | 4/2019 | Armand | H04B 7/0617 |
| 2020/0127907 A1* | 4/2020 | Koo | H04W 24/04 |
| 2021/0321231 A1* | 10/2021 | Xu | H04W 4/02 |

* cited by examiner

ENVIRONMENT SCANNING USING A CELLULAR NETWORK

BACKGROUND

Modern telecommunications systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, new networks with higher capabilities have been developed. The 5G telecommunications technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

The 5G telecommunications technologies utilize the existing LTE frequency band (600 MHz to 6 GHz) and millimeter wave (mmWave) bands (24-86 GHz) and aim to provide higher data rates and low latency. However, as a higher frequency is used, such as the mmWave, the path loss associated with the higher frequency signal increases, leading to a shorter coverage for a given power, and the directionality of the signal becomes narrower, requiring a point-to-point communication. Compared to the existing telecommunication standards (2G, 3G, and 4G/LTE), the 5G mmWave telecommunication is more susceptible to the environment, for example, the surrounding of a user equipment (UE), which may quickly change, for example, from an open field to a street surrounded by tall buildings in a moving vehicle.

The mmWave spectrum has additional uses beyond the 5G telecommunications due to its unique characteristics. While the mmWave signal does not have the ability to penetrate through objects and is generally reflected off of objects in its path, this reflection characteristic allows the mmWave spectrum to be suitable in radar systems for locating objects and mapping a surrounding area. The mmWave spectrum is used in this context at various frequencies for police radar detectors, military applications, automotive driver assistance systems, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

A method, system, and apparatus disclosed herein are directed to extracting topographic information of surrounding areas of a cellular network based on reflected signals of cellular communication signals in the mmWave band.

A mmWave radio component including a transmitter and a receiver of a cellular network system mounted on a cellular tower, building, or other infrastructure serving as a cell site, may be used to transmit a communication signal in the mmWave radio band to a target UE in a surrounding area. While a portion of the transmitted communication signal may be received and processed by the UE as intended, a majority of the transmitted communication signal, i.e., electromagnetic energy of the transmitted communication signal, may be absorbed or reflected by objects in its path, such as air, buildings, trees, terrain, and the like. Some of the reflected signal may be received by a receiver of the mmWave radio component. Based on one or more characteristics of the reflected signal relative to the corresponding characteristics of the transmitted communication signal, topographic, or map, data of the surrounding area may be extracted from the reflected signal. Additionally, velocity of moving objects and types of certain objects in the surrounding area may be determined, and computations to determine such information may be performed at the edge, i.e., by utilizing edge computing, to obtain near real-time information about the surrounding area.

Figure 1:
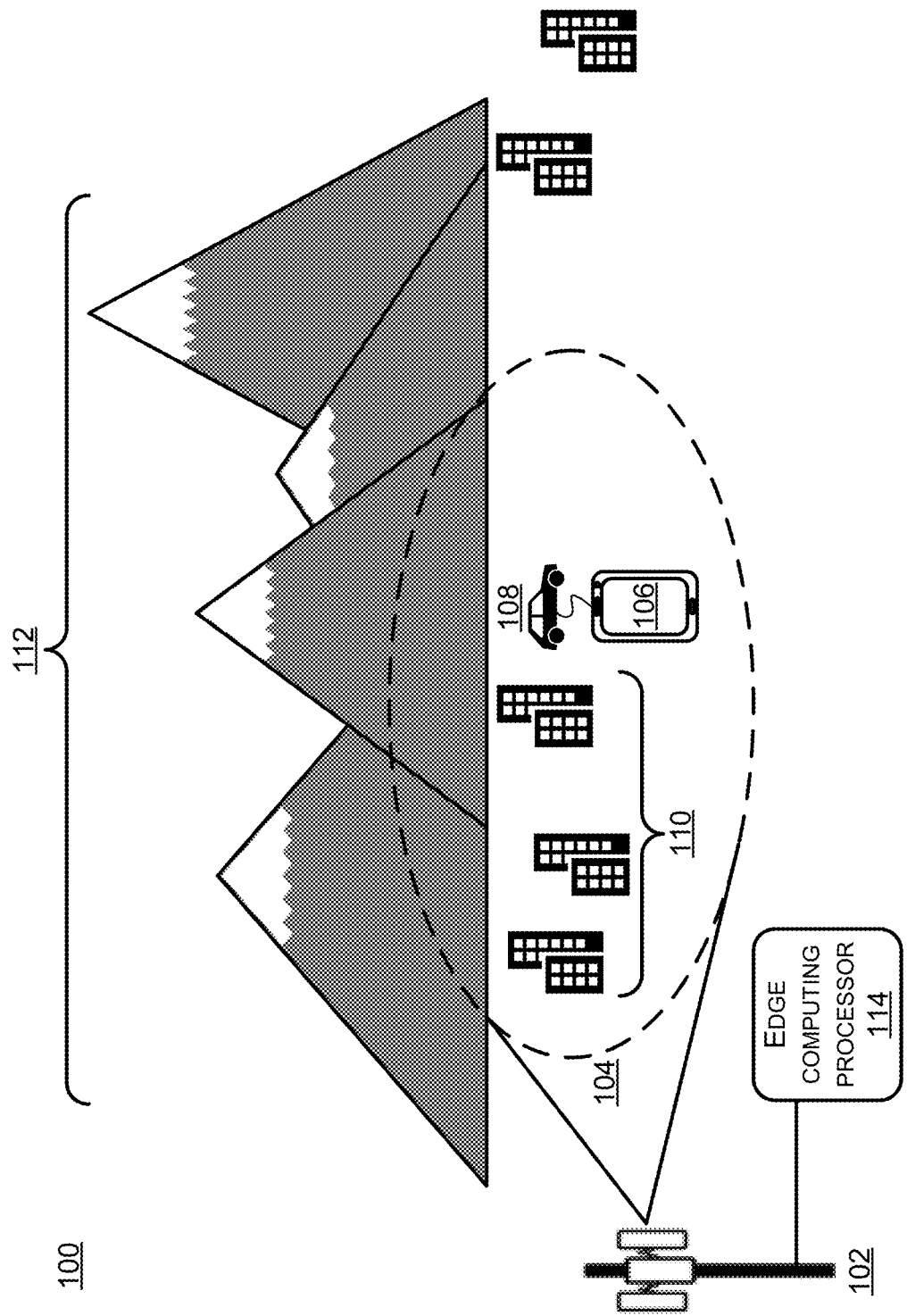
FIG. 1 illustrates an example environment in which a single cellular tower is utilized to determine topographic data of the surrounding area of the cellular tower.

FIG. 1 illustrates an example environment 100 in which a single cellular tower 102 is utilized to determine topographic data of the surrounding area 104. The transmitter (not shown) at the cellular tower 102 may transmit mmWave communication signals intended for a UE 106 in a car 108 currently located in the surrounding area 104. The surrounding area 104 may also include building structures 110, natural terrain 112, and other man-made or natural objects (not shown). The topographic data of the surrounding area 104 may then be obtained based on reflected signals of the mmWave communication signals from these objects that are received by the receiver located at the cellular tower 102. The reflected signals may be processed, and the topographic data may be stored, at the cellular tower 102 or an edge computing processor 114 located remotely from the cellular tower 102.

Figure 2:
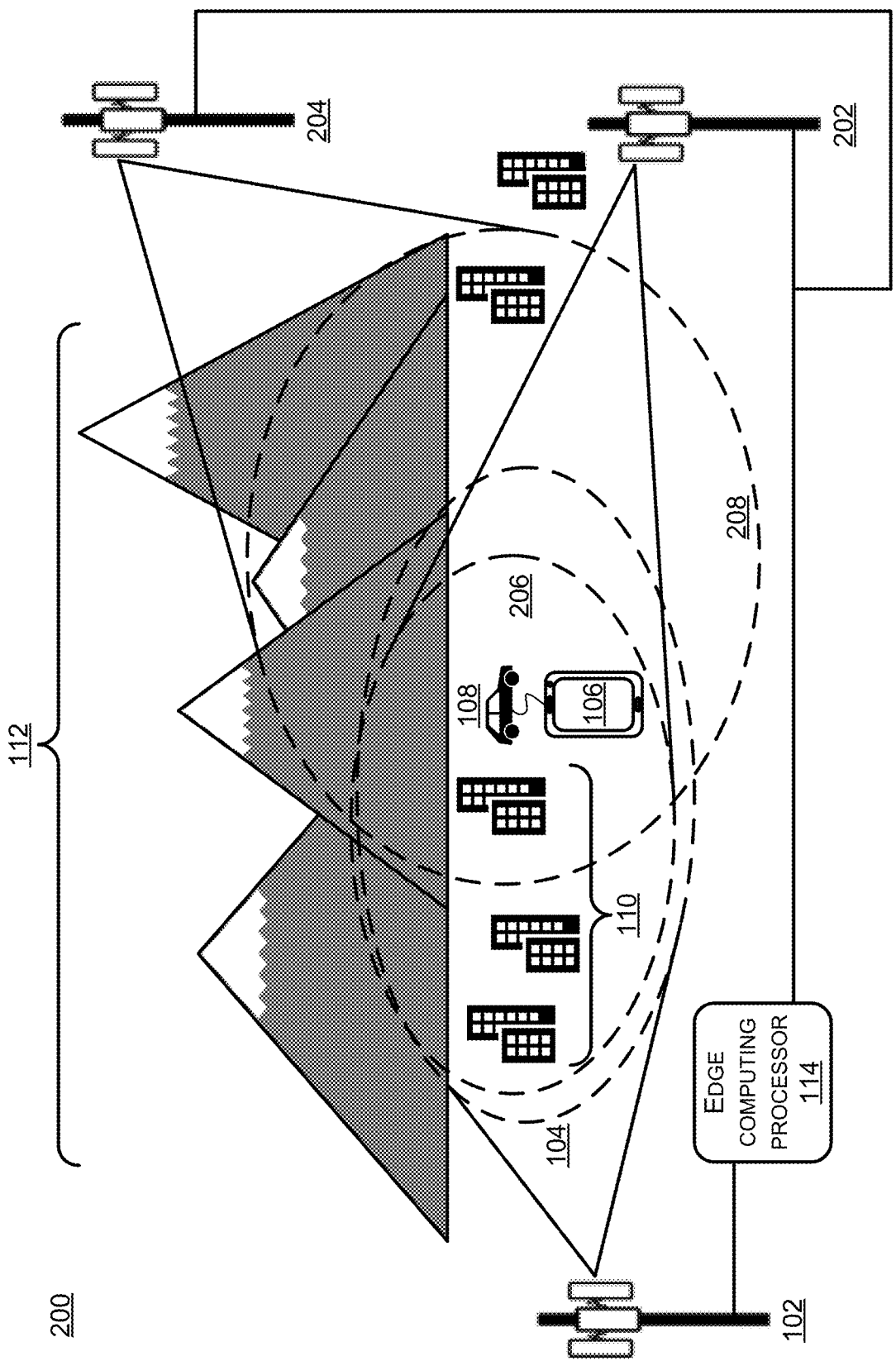
FIG. 2 illustrates an example environment in which a plurality of cellular towers is utilized to determine topographic data of the surrounding area.

FIG. 2 illustrates an example environment 200 in which a plurality of cellular towers (102, 202, and 204 shown in this example) is utilized to determine topographic data of the surrounding area 104.

With a single point of data collection at the cellular tower 102, the topographic data of the surrounding area 104 may be limited. The mmWave radio components located at a plurality of cell sites, or cell towers, may be used to obtain more detailed topographic data of the surrounding area 104. By utilizing the plurality of cell towers 102, 202, and 204, blind spots created by obstructions and/or non-line of sight conditions for one cell site may be reduced and reflected signals from other cell sites having multiple different angles and directions may be obtained. The reflected signals from the surrounding area 104 obtained by the plurality of the cell sites may be processed, and the topographic data may be aggregated and stored, at the edge computing processor 114 located remotely from the plurality of cell towers 102, 202, and 204. Note that the areas actually covered 104, 206, and 208 by the cell towers, 102, 202, and 204, respectively, may not be exactly the same but may at least overlap some portions of the surrounding area 104. The plurality of cell towers 102, 202, and 204 may also provide topographic data of the areas 206 and 208 in addition to the topographic data of the surrounding area 104.

The topographic data of the surrounding area 104 may used to generate a topographic map of the surrounding area 104. In general, topographic data may be time-stamped and stored such that changes over time, or in near real-time, of an area associated with the topographic data, such as the surrounding area 104, may be tracked or determined.

Although cell towers with transmitters and receivers are described above in obtaining topographic data, mmWave transmitters and receivers for a cellular communication network may be deployed in smaller scale cells.

Figure 3:
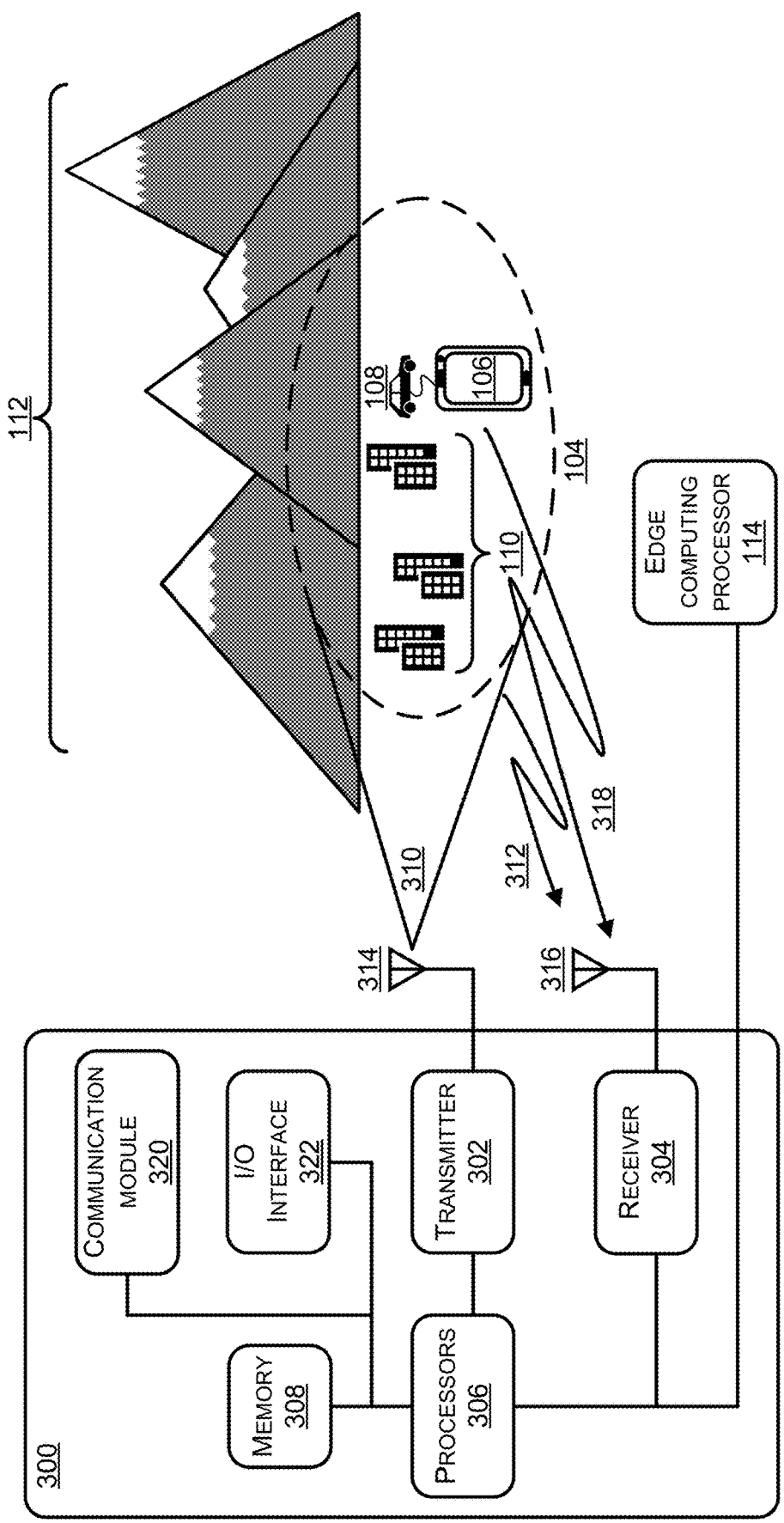
FIG. 3 illustrates an example cellular network system for determining topographic data of its surrounding area.

FIG. 3 illustrates an example cellular network system 300 for determining topographic data of its surrounding area 104.

The cellular network system 300 may comprise a transmitter 302, a receiver 304, one or more processors (processors) 306 communicatively coupled to the transmitter 302 and the receiver 304, and memory 308 communicatively coupled to the processors 306. As described above, the cellular network system 300 may be located at a cellular tower, such as the cellular tower 102, as described in FIG. 1.

The memory 308 may store computer-executable instructions that, when executed by the processors 306, instruct the processors 306 to perform certain operations. For example, the processors 306 may transmit, by the transmitter 302, a first signal 310 in a target direction for communicating with the UE 106 located in the surrounding area 104. The processors 306 may then receive, by the receiver 304, a second signal, and determine that the second signal is a reflected signal 312 associated with the first signal 310. The processors 306 may determine, based at least in part on the second signal, or now equivalently the reflected signal 312, topographic data associated with the surrounding area 104 of the cellular network system 300 and generate an area topographic map of the surrounding area 104 based on the topographic data.

The transmitter 302 may comprise one or more transmit antennas (Tx antenna) 314 for transmitting the first signal 310. The Tx antenna 314 may be a multiple-input and multiple-output (MIMO) antenna, a directional antenna, a phased array antenna, or any other antenna types suitable for transmitting mmWave signals. The Tx antenna 314 may steer the first signal 310 in the target direction and may horizontally, or vertically, beam-shape the first signal 310.

The receiver 304 may comprise one or more receive antennas (Rx antenna) 316 for receiving the reflected signal 312. The Rx antenna 316 may be a MIMO antenna, a directional antenna, a phased array antenna, or any other antenna types suitable for receiving mmWave signals. The Rx antenna 316, however, may also receive a second signal that is not the reflected signal 312. To determine that the second signal is the reflected signal 312, the processors 306 may first determine one or more characteristics of the second signal including, but not limited to, a signal strength, a phase, an arrival time, a frequency shift, a polarization of the second signal, a direction associated with the second signal, and the like, and may then evaluate the one or more characteristics of the second signal relative to the corresponding characteristics of the first signal 310.

Once the processors 306 determines that the second signal is the reflected signal 312 based on the one or more characteristics of the second signal, the processors 306 may determine the topographic data based at least in part on the characteristics of the second signal, which is now determined to be the reflected signal 312 and generate an area topographic map of the surrounding area 104 based on the topographic data.

Because signals at different frequencies have different characteristics, such as dispersion, absorption, reflectivity, and the like, to improve or enhance the topographic data based on the characteristics of a reflected signal, the transmitter 314 may transmit the first signal 310 at a plurality of frequencies in the mmWave spectrum, and the receiver 304 may receive the second signal, which may be determined to be the reflected signal 312, at the plurality of frequencies. The first signal 310 may also have different bandwidth at each frequency of the plurality of frequencies. The transmitter 302 may also transmit a specific transmit signal, that is different from and in addition to, the communication signal such as the first signal 310 intended for the UE 106. The specific transmit signal may be transmitted for the purpose of producing a specific reflection signal, which is received by the receiver 304, and then processed by the processors 306 similar to the reflected signal 312 discussed above. The specific transmit signal may have a higher peak power than the communication signal, such as the first signal 310, but may have a different modulation and a shorter duration such that an average peak-to-power ratio remains at or below a relevant requirement.

The processors 306 may also include an edge computing processor, such as the edge computing processor 114 as described with reference to FIG. 1, that is remotely located from the transmitter 302 and the receiver 304. The reflected signal 312 may be processed, and the topographic data may be stored, at the cellular tower 102 or by the edge computing processor 114.

The receiver 304 may additionally receive a third signal 318, and the processors 306 may determine that the third signal 318 is from the UE 106 in response to the first signal 310. The third signal 318 may include local topographic data of a local area relative to a location of the UE 106. The processors 306 may generate the area topographic map of the surrounding area 104 by aggregating the topographic data obtained from the reflected signal 312 with and the local topographic data from the UE 106.

The cellular network system 300 may additionally include a communication module 320 and an input/output (I/O) interface 322 communicatively coupled to the processors 306. The communication module 320 may allow the cellular network system 300 to communicate over a network (not shown) with other devices or base stations (not shown), a data center of the mobile network operator of the cellular network system 300, third party websites, and the like. The network may include the Internet, wired media such as a wired network or direct-wired connections, and wireless media such as acoustic, radio frequency (RF), infrared, and other wireless media. The I/O interface 322 may receive data and inputs, and output displays, notifications, texts, and the like, associated with the operation of the cellular network system 300.

Figure 4:
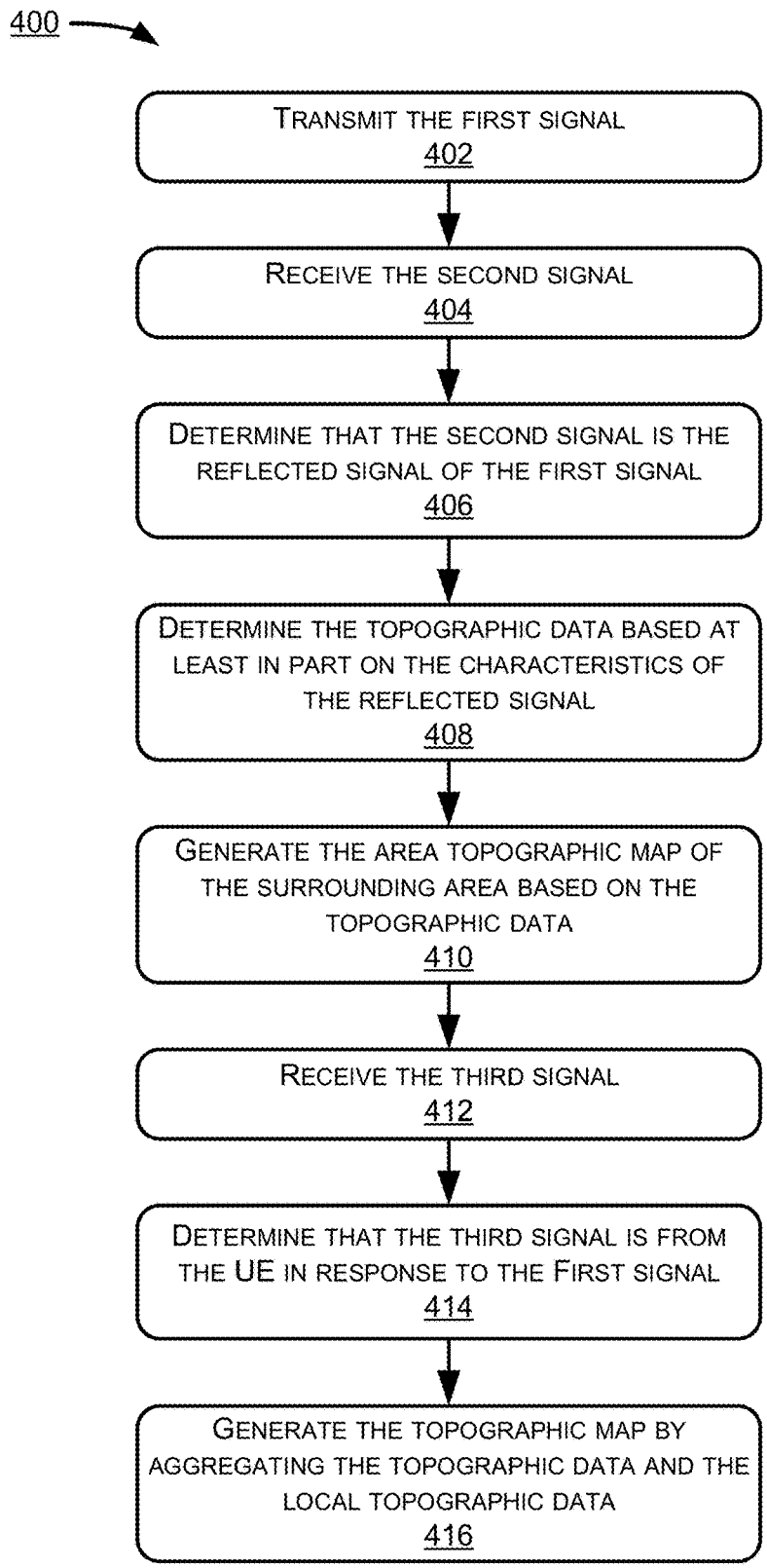
FIG. 4 illustrates an example process for obtaining topographic data of an area and generating a topographic map of the area based on a reflected signal of a communication signal in the mmWave band.

FIG. 4 illustrates an example process 400 for obtaining topographic data of an area and generating a topographic map of the area based on a reflected signal of a communication signal in the mmWave band.

As described above with reference to FIG. 3, the cellular network system 300 may transmit, by the transmitter 302, the first signal 310 in the target direction at block 402. The first signal 310 may be a communication signal intended for the UE 106 located in the surrounding area 104. At block 404, the cellular network system 300 may receive, by the receiver 304, the second signal, and the processors 306 may determine that the second signal is the reflected signal 312 associated with the first signal 310 at block 406. As described with reference to FIG. 3, the transmitter 314 may transmit the first signal 310 at a plurality of frequencies in the mmWave spectrum, the receiver 304 may receive the second signal at the plurality of frequencies, and the first signal 310 may also have different bandwidth at each frequency of the plurality of frequencies and include the specific transmit signal as described above with reference to FIG. 3. The processors 306 may first determine one or more characteristics of the second signal including, but not limited to, a signal strength, a phase, an arrival time, a frequency shift, a polarization of the second signal, a direction associated with the second signal, and the like, and may then evaluate the one or more characteristics of the second signal relative to the corresponding characteristics of the first signal 310 to determine whether the second signal is the reflected signal 312.

At block 408, the processors 306 may determine the topographic data based at least in part on the characteristics of the second signal, i.e., the reflected signal 312, and generate an area topographic map of the surrounding area 104 based on the topographic data at block 410. The processors 306 may also include the edge computing processor 114 as described with reference to FIGS. 1 and 3, and the operations of block 410 may be performed by the edge computing processor 114. The topographic data may be stored, at the cellular tower 102 or by the edge computing processor 114.

At block 412, the receiver 304 may additionally receive the third signal 318, and at block 414, the processors 306 may determine that the third signal 318 is from the UE 106 in response to the first signal 310 and includes local topographic data of the local area relative to the location of the UE 106. The processors 306, at block 416, may generate the area topographic map of the surrounding area 104 by aggregating the topographic data obtained from the reflected signal 312 with and the local topographic data from the UE 106.

As described with reference to FIG. 2, a plurality of cellular network systems (not shown), similar to the cellular network system 300, located at the cellular towers 202 and 204 may be used to obtain more detailed topographic data of the surrounding area 104 by aggregating the topographic data associated with the surrounding area 104 from each cellular network system at the edge computing processor 114 located remotely from the plurality of cell towers 102, 202, and 204.

Figure 5:
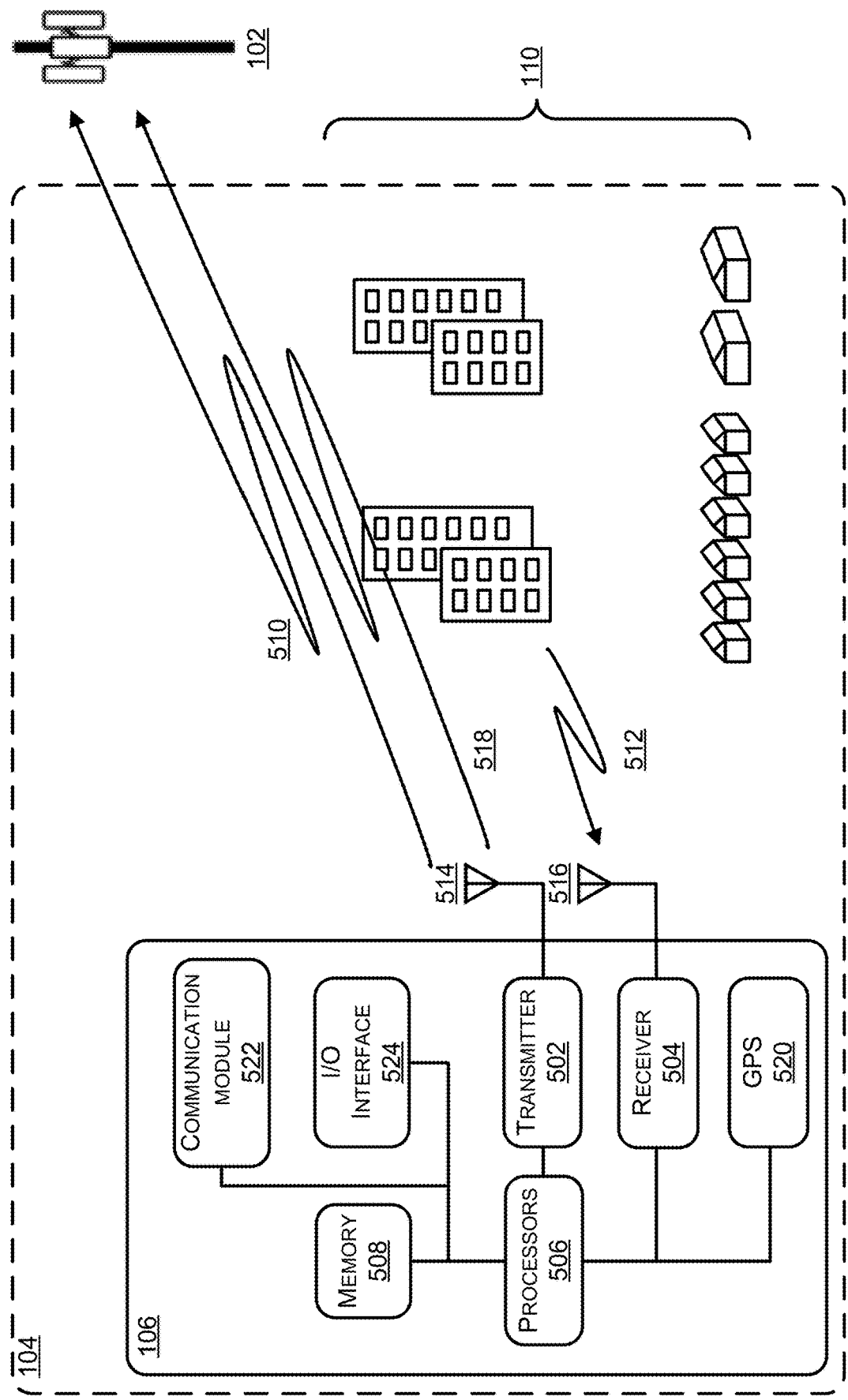
FIG. 5 illustrates an example block diagram of a UE used to provide local topographic data of a local area relative to a location of the UE.

FIG. 5 illustrates an example block diagram of a UE, such as the UE 106, used to provide the local topographic data of a local area relative to a location of the UE 106.

The UE 106 may comprise a transmitter 502, a receiver 504, one or more processors (processors) 506 communicatively coupled to the transmitter 502 and the receiver 504, and memory 508 communicatively coupled to the processors 506. As described above with reference to FIGS. 1-3, the UE 106 may be currently located in the surrounding area 104 of the cellular tower 102.

The memory 508 may store computer-executable instructions that, when executed by the processors 506, instruct the processors 506 to perform certain operations. For example, the processors 506 may transmit, by the transmitter 502, a first UE signal 510 for communicating with the cellular network system 300 located at the cellular tower 102. The processors 506 may then receive, by the receiver 504, a second UE signal, and determine that the second UE signal is a reflected UE signal 512 associated with the first UE signal 510. The reflected UE signal 512 may be a result of the first UE signal 510 reflected from objects in its path, such as the building structures 110. The processors 506 may determine, based at least in part on the second UE signal, or now equivalently the reflected UE signal 512, local topographic data associated with a local area 514 of the UE 106 within the surrounding area 104.

The transmitter 502 may comprise one or more transmit antennas (Tx antenna) 514 for transmitting the first UE signal 510. The Tx antenna 514 may be a multiple-input and multiple-output (MIMO) antenna, a directional antenna, a phased array antenna, or any other antenna types suitable for transmitting mmWave signals. The Tx antenna 514 may steer the first UE signal 510 by horizontally, or vertically, beam-shape the first UE signal 510.

The receiver 504 may comprise one or more receive antennas (Rx antenna) 516 for receiving the reflected UE signal 512. The Rx antenna 516 may be a MIMO antenna, a directional antenna, a phased array antenna, or any other antenna types suitable for receiving mmWave signals. The Rx antenna 516, however, may also receive a second UE signal that is not the reflected UE signal 512. To determine that the second UE signal is the reflected UE signal 512, the processors 506 may first determine one or more characteristics of the second UE signal including, but not limited to, a signal strength, a phase, an arrival time, a frequency shift, a polarization of the second signal, a direction associated with the second UE signal, and the like, and may then evaluate the one or more characteristics of the second UE signal relative to the corresponding characteristics of the first UE signal 510.

Once the processors 506 determines that the second UE signal is the reflected UE signal 512 based on the one or more characteristics of the second UE signal, the processors 506 may determine the local topographic data based at least in part on the characteristics of the second UE signal, which is now determined to be the reflected UE signal 512.

Because signals at different frequencies have different characteristics, such as dispersion, absorption, reflectivity, and the like, to improve or enhance the topographic data based on the characteristics of a reflected signal, the transmitter 514 may transmit the first UE signal 510 at a plurality of frequencies in the mmWave spectrum, and the receiver 504 may receive the second UE signal, which may be determined to be the reflected UE signal 512, at the plurality of frequencies. The first UE signal 510 may also have different bandwidth at each frequency of the plurality of frequencies. The transmitter 502 may also transmit a specific transmit signal, that is different from and in addition to, the communication signal such as the first UE signal 510 intended for the cellular network system 300. The specific transmit signal may be transmitted for the purpose of producing a specific reflection signal, which is received by the receiver 504, and then processed by the processors 506 similar to the reflected UE signal 512 discussed above. The specific transmit signal may have a higher peak power than the communication signal, such as the first UE signal 510, but may have a different modulation and a shorter duration such that an average peak-to-power ratio remains at or below a relevant requirement.

The transmitter 502 may additionally transmit a third UE signal 518 including the local topographic data. The local topographic data may be timestamped and include location information of the UE 106 when the UE 106 transmitted the first UE signal 510 based on which the local topographic data was generated. The location information of the UE 106 may be obtained by a locator 520, which may be a Global Positioning System (GPS) built into the UE 106. The local topographic data may be aggregated with the topographic data of the surrounding area 104, and stored, by the processors 308, including the edge computing processor 114.

The UE 106 may additionally include a communication module 522 and an input/output (I/O) interface 524 communicatively coupled to the processors 506. The communication module 522 may allow the UE 106 to communicate over a network (not shown) with other devices, such as a headphone set, speakers, a TV, a printer, a WiFi hotspot, a near-field communication (NFC) device, and the like. The network may include the Internet, wired media such as a wired network or direct-wired connections, and wireless media such as acoustic, radio frequency (RF), infrared, and other wireless media. The I/O interface 524 may receive data and inputs, and output displays, notifications, texts, and the like, associated with the operation of the UE 106.

Figure 6:
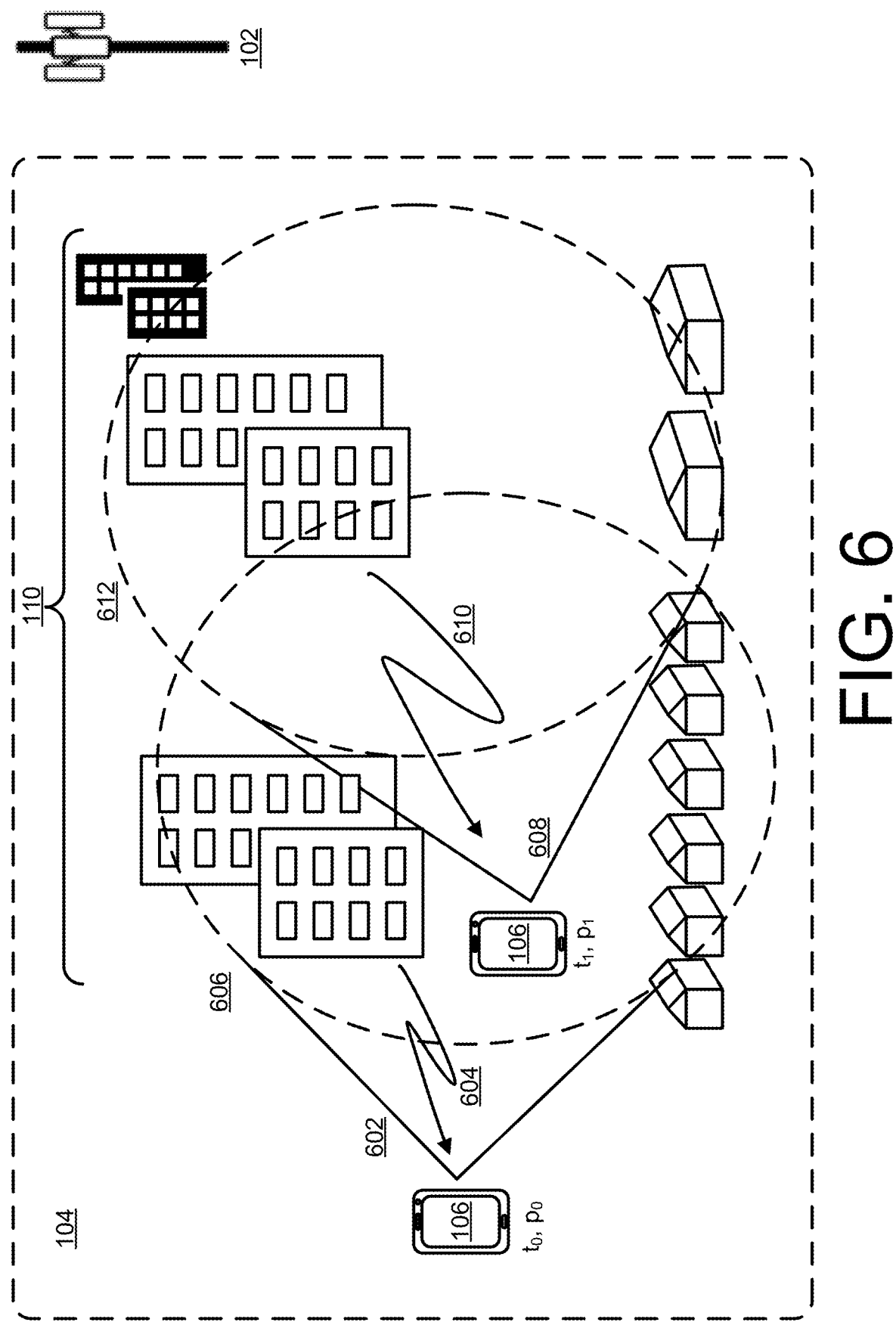
FIG. 6 illustrates example reflected signals based on transmitted signals from the UE as the UE moves in space and time.

The UE 106 is not permanently fixed to a particular location and a user carrying the UE 106 may move, for example, in the moving car 108 as shown in FIGS. 1-3, the local topographic data generated by the UE 106 may provide more detailed and localized view of the local area of the UE 106 as the UE 106 moves and receives the reflected UE signal from different locations. FIG. 6 illustrates example reflected signals based on transmitted signal from the UE 106 as the UE 106 moves in space and time.

At time to and position $p_0$, the UE 106 may transmit a first UE signal 602 towards the cellular network system 300 at the cellular tower 102 and receive a reflected UE signal 604 from a local area 606. At time ti and position pi, the UE 106 may transmit the first UE signal 608 towards the cellular network system 300 at the cellular tower 102 and receive the reflected UE signal 610 from a local area 612, which may overlap the previous local area 606. The local topographic data based on the reflected UE signals 604 and 610 may then be transmitted to the cellular network system 300 as the third UE signal 518 as described with reference FIG. 5.

Figure 7:
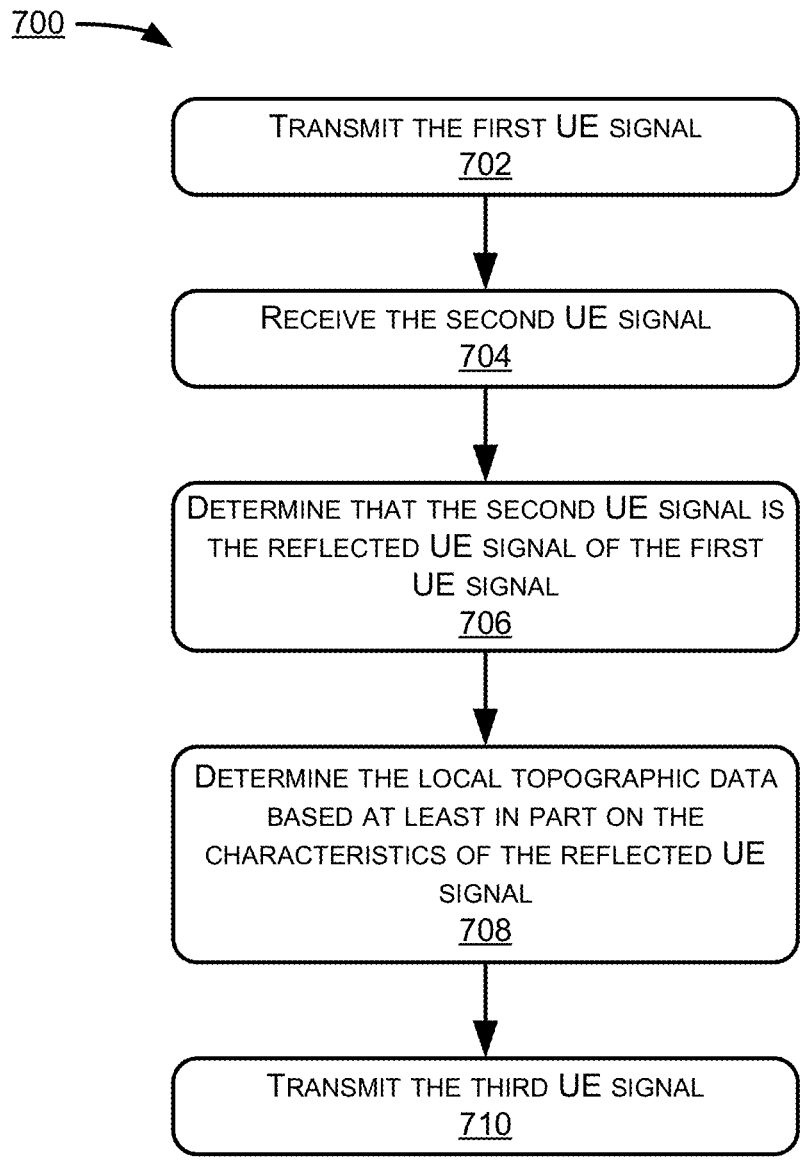
FIG. 7 illustrates an example process for obtaining local topographic data of an area near the UE based on a reflected UE signal of a communication signal in the mmWave band.

FIG. 7 illustrates an example process 700 for obtaining topographic data of an area and generating a topographic map of the area based on a reflected signal of a communication signal in the mmWave band.

As described above with reference to FIG. 5, the UE 106 may transmit, by the transmitter 502, the first UE signal 510 in towards the cellular network system 300 at block 702. The first UE signal 510 may be a communication signal intended for the cellular network system 300 at cellular tower 102. At block 704, the UE 106 may receive, by the receiver 504, the second UE signal, and the processors 506 may determine that the second UE signal is the reflected UE signal 512 associated with the first UE signal 510 at block 706. As described with reference to FIG. 5, the transmitter 514 may transmit the first UE signal 510 at a plurality of frequencies in the mmWave spectrum, the receiver 504 may receive the second UE signal at the plurality of frequencies, and the first UE signal 510 may also have different bandwidth at each frequency of the plurality of frequencies and include the specific transmit signal. The processors 506 may first determine one or more characteristics of the second UE signal including, but not limited to, a signal strength, a phase, an arrival time, a frequency shift, a polarization of the second signal, a direction associated with the second UE signal, and the like, and may then evaluate the one or more characteristics of the second UE signal relative to the corresponding characteristics of the first UE signal 510 to determine whether the second UE signal is the reflected UE signal 512.

At block 708, the processors 506 may determine the local topographic data based at least in part on the characteristics of the second UE signal, i.e., the reflected UE signal 512. At block 710, the transmitter 502 may additionally transmit the third signal 318, which may include local topographic data of the local area relative to the location of the UE 106. The local topographic data may be processed by the processors 306 of the cellular network system 300 to generate the area topographic map of the surrounding area 104 by aggregating the topographic data obtained from the reflected signal 312 with and the local topographic data from the UE 106.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media include at least two types of computer-readable media, namely computer-readable storage media and communications media. Computer-readable storage media include volatile and non-volatile, removable and non-removable media implemented in any process or technology for storage of information such as computer-readable instructions, data structures, program modules, or other data. Computer-readable storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A cellular network system comprising: a transmitter; a receiver; one or more processors communicatively coupled to the transmitter and the receiver; and memory communicatively coupled to the one or more processors, the memory storing thereon computer-executable instructions that, when executed by the one or more processors perform operations, the operations comprising: transmitting, by the transmitter, a first signal in a target direction, the first signal being a communication signal intended for a user equipment (UE); receiving, by the receiver, a second signal; determining, by the one or more processors, that the second signal is a reflected signal associated with the first signal; determining, by the one or more processors and based at least in part on the second signal, topographic data associated with a surrounding area of the cellular network system in the target direction; and generating, by the one or more processors, an area topographic map of the surrounding area based on the topographic data.

B. The cellular network system as paragraph A recites, wherein the one or more processors include an edge computing processor remotely located from the transmitter and the receiver, and wherein generating, by the one or more processors, the area topographic map of the surrounding area based on the topographic data includes generating, by the edge processor, the area topographic map of the surrounding area based on the topographic data.

C. The cellular network system as paragraph A recites, wherein: the transmitter comprises one or more transmit antennas, and the operations further comprise: steering, by the one or more transmit antennas, the first signal in the target direction.

D. The cellular network system as paragraph C recites, wherein steering, by the one or more transmit antennas, the first signal in the target direction includes: horizontal beam-shaping of the first signal, and vertical beam-shaping of the first signal.

E. The cellular network system as paragraph A recites, wherein determining the topographic data includes determining the topographic data based at least in part on a characteristic of the second signal, the characteristic including at least one of: a signal strength of the second signal, a phase of the second signal, an arrival time of the second signal, a frequency shift of the second signal, a polarization of the second signal, and a direction associated with the second signal.

F. The cellular network system as paragraph E recites, wherein the characteristic of the second signal is evaluated relative to a corresponding characteristic of the first signal.

G. The cellular network system as paragraph A recites, wherein the operations further comprise: transmitting, by the transmitter, the first signal at a plurality of frequencies, and receiving, by the receiver, the second signal at the plurality of frequencies.

H. The cellular network system as paragraph A recites, wherein the operations further comprise: receiving, by the receiver, a third signal; and determining, by the one or more processors, that the third signal is from the UE in response to the first signal, the third signal including local topographic data of a local area relative to a location of the UE, wherein generating, by the one or more processors, the area topographic map of the surrounding area based on the topographic data includes generating, by the one or more processors, the area topographic map by aggregating the topographic data and the local topographic data.

I. The cellular network system as paragraph H recites, wherein aggregating the topographic data and the local topographic data includes aggregating the topographic data and the local topographic data by the edge computing processor.

J. A user equipment (UE) comprising: a transmitter; a receiver; one or more processors communicatively coupled to the transmitter and the receiver; and memory communicatively coupled to the one or more processors, the memory storing thereon computer-executable instructions that, when executed by the one or more processors perform operations, the operations comprising: transmitting, by the transmitter, a first UE signal, the first UE signal being a communication signal for communicating with a cellular network; receiving, by the receiver, a second UE signal; determining, by the one or more processors, that the second UE signal is a reflected UE signal associated with the first UE signal; determining, by the one or more processors and based at least in part on the second UE signal, local topographic data associated with a local area of the UE; and transmitting, by the transmitter, a third UE signal for communicating with the cellular network, the third UE signal including the local topographic data.

K. The UE as paragraph J recites, further comprising: a locator communicatively coupled to the one or more processors, wherein the operations further comprise: determining, by the locator, location information of the UE when the transmitter transmits the first UE signal, wherein the third UE signal includes the location information.

L. The UE as paragraph K recites, wherein the local topographic data and the location information are aggregated with an area topographic map of the cellular network.

M. The UE as paragraph J recites, wherein: the transmitter comprises one or more transmit antennas, and the operations further comprise: steering, by the one or more transmit antennas, at least one of the first UE signal or the third UE signal in a direction of the cellular network.

N. The UE as paragraph M recites, wherein steering, by the one or more transmit antennas, the at least one of the first UE signal or the third UE signal includes: horizontal beam-shaping of the at least one of the first UE signal or the third UE signal, and vertical beam-shaping of the at least one of the first UE signal or the third UE signal.

O. The UE as paragraph J recites, wherein determining the local topographic data includes determining the local topographic data based at least in part on a characteristic of the second UE signal, the characteristic including at least one of: a signal strength of the second UE signal, a phase of the second UE signal, an arrival time of the second UE signal, a frequency shift of the second UE signal, a polarization of the second UE signal, and a direction associated with the UE second signal.

P. The UE as paragraph O recites, wherein the characteristic of the second UE signal is evaluated relative to a corresponding characteristic of the first UE signal.

Q. The UE as paragraph J recites, wherein the operations further comprise: transmitting, by the transmitter, the first UE signal at a plurality of frequencies, and receiving, by the receiver, the second UE signal at the plurality of frequencies.

R. A non-transitory computer-readable storage medium storing computer-readable instructions executable by one or more processors, that when executed by the one or more processors, cause the one or more processors to perform operations comprising: transmitting, by a transmitter of a cellular network system, a first signal in a target direction, the first signal being a communication signal for communicating with a user equipment (UE); receiving, by a receiver of the cellular network system, a second signal; determining, by the one or more processors, that the second signal is a reflected signal associated with the first signal; determining, by the one or more processors and based at least in part on the second signal, topographic data associated with a surrounding area of the cellular network system in the target direction; and generating, by the one or more processors, an area topographic map of the surrounding area based on the topographic data.

S. The non-transitory computer-readable storage medium as paragraph R recites, wherein the one or more processors include an edge computing processor remotely located from the transmitter and the receiver, and wherein generating, by the one or more processors, the area topographic map of the surrounding area based on the topographic data includes generating, by the edge processor, the area topographic map of the surrounding area based on the topographic data.

T. The non-transitory computer-readable storage medium as paragraph R recites, the operations further comprise: steering the first signal in the target direction.

U. The non-transitory computer-readable storage medium as paragraph T recites, wherein steering the first signal in the target direction includes: horizontal beam-shaping of the first signal, and vertical beam-shaping of the first signal.

V. The non-transitory computer-readable storage medium as paragraph R recites, wherein determining the topographic data includes determining the topographic data based at least in part on a characteristic of the second signal, the characteristic including at least one of: a signal strength of the second signal, a phase of the second signal, an arrival time of the second signal, a frequency shift of the second signal, a polarization of the second signal, and a direction associated with the second signal.

W. The non-transitory computer-readable storage medium as paragraph V recites, wherein the characteristic of the second signal is evaluated relative to a corresponding characteristic of the first signal.

X. The non-transitory computer-readable storage medium as paragraph R recites, wherein the operations further comprise: transmitting, by the transmitter, the first signal at a plurality of frequencies, and receiving, by the receiver, the second signal at the plurality of frequencies.

Y. The non-transitory computer-readable storage medium as paragraph R recites, wherein the operations further comprise: receiving, by the receiver, a third signal; and determining, by the one or more processors, that the third signal is from the UE in response to the first signal, the third signal including local topographic data of a local area relative to a location of the UE, wherein generating, by the one or more processors, the area topographic map of the surrounding area based on the topographic data includes generating, by the one or more processors, the area topographic map by aggregating the topographic data and the local topographic data.

Z. The non-transitory computer-readable storage medium as paragraph Y recites, wherein aggregating the topographic data and the local topographic data includes aggregating the topographic data and the local topographic data by the edge computing processor.

AA. A cellular network system comprising: an edge computing processor; and a plurality of base stations communicatively coupled to the edge processor, each base station of the plurality of base stations comprising: a transmitter, a receiver; one or more processors communicatively coupled to the transmitter and the receiver, and memory communicatively coupled to the one or more processors, the memory storing thereon computer-executable instructions that, when executed by the one or more processors perform operations, the operations comprising: transmitting, by the transmitter, a first signal in a target direction, the first signal being a communication signal for communicating with a user equipment (UE); receiving, by the receiver, a second signal; determining, by the one or more processors, that the second signal is a reflected signal associated with the first signal; determining, by the one or more processors and based at least in part on the second signal, topographic data associated with a surrounding area of the cellular network system in the target direction; and sending the topographic data to the edge computing processor, wherein the edge computing processor is configured to: aggregate the topographic data from the plurality of base stations; and generate an area topographic map of the surrounding area based on the topographic data.

AB. The cellular network system as paragraph AA recites, wherein the edge computing processor is located remote from the plurality of base stations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A cellular network system comprising:
   a transmitter;
   a receiver;
   one or more processors communicatively coupled to the transmitter and the receiver; and
   memory communicatively coupled to the one or more processors, the memory storing thereon computer-executable instructions that, when executed by the one or more processors perform operations, the operations comprising:
      transmitting, by the transmitter, a first signal in a target direction, the first signal being a communication signal intended for a user equipment (UE);
      receiving, by the receiver, a second signal;
      determining, by the one or more processors, that the second signal is a reflected signal associated with the first signal;
      determining, by the one or more processors and based at least in part on the second signal, topographic data associated with a surrounding area of the cellular network system in the target direction;

receiving, by the receiver, a third signal;

determining, by the one or more processors, that the third signal is from the UE in response to the first signal, the third signal including local topographic data of a local area relative to a location of the UE; and generating, by the one or more processors, an area topographic map of the surrounding area based on the topographic data and by aggregating the topographic data and the local topographic data.

2. The cellular network system of claim 1, wherein the one or more processors include an edge computing processor remotely located from the transmitter and the receiver, and wherein generating, by the one or more processors, the area topographic map of the surrounding area based on the topographic data includes generating, by the edge processor, the area topographic map of the surrounding area based on the topographic data.

3. The cellular network system of claim 1, wherein:

the transmitter comprises one or more transmit antennas, and the operations further comprise:

steering, by the one or more transmit antennas, the first signal in the target direction.

4. The cellular network system of claim 1, wherein determining the topographic data includes determining the topographic data based at least in part on a characteristic of the second signal, the characteristic including at least one of:

a signal strength of the second signal, a phase of the second signal, an arrival time of the second signal, a frequency shift of the second signal, a polarization of the second signal, and a direction associated with the second signal.

5. The cellular network system of claim 1, wherein the operations further comprise:

transmitting, by the transmitter, the first signal at a plurality of frequencies, and receiving, by the receiver, the second signal at the plurality of frequencies.

6. The cellular network system of claim 1, wherein aggregating the topographic data and the local topographic data includes aggregating the topographic data and the local topographic data by an edge computing processor.

7. A user equipment (UE) comprising:

a transmitter;

a receiver;

one or more processors communicatively coupled to the transmitter and the receiver; and memory communicatively coupled to the one or more processors, the memory storing thereon computer-executable instructions that, when executed by the one or more processors perform operations, the operations comprising:

transmitting, by the transmitter, a first UE signal, the first UE signal being a communication signal for communicating with a cellular network;

receiving, by the receiver, a second UE signal;

determining, by the one or more processors, that the second UE signal is a reflected UE signal associated with the first UE signal;

determining, by the one or more processors and based at least in part on the second UE signal, local topographic data associated with a local area of the UE; and transmitting, by the transmitter, a third UE signal for communicating with the cellular network, the third UE signal including the local topographic data, wherein the local topographic data is aggregated with an area topographic map of the cellular network.

8. The UE of claim 7, further comprising:

a locator communicatively coupled to the one or more processors, wherein the operations further comprise:

determining, by the locator, location information of the UE when the transmitter transmits the first UE signal, wherein the third UE signal includes the location information.

9. The UE of claim 7, wherein:

the transmitter comprises one or more transmit antennas, and the operations further comprise:

steering, by the one or more transmit antennas, at least one of the first UE signal or the third UE signal in a direction of the cellular network.

10. The UE of claim 7, wherein determining the local topographic data includes determining the local topographic data based at least in part on a characteristic of the second UE signal, the characteristic including at least one of:

a signal strength of the second UE signal, a phase of the second UE signal, an arrival time of the second UE signal, a frequency shift of the second UE signal, a polarization of the second UE signal, and a direction associated with the UE second signal.

11. The UE of claim 7, wherein the operations further comprise:

transmitting, by the transmitter, the first UE signal at a plurality of frequencies, and receiving, by the receiver, the second UE signal at the plurality of frequencies.

12. A non-transitory computer-readable storage medium storing computer-readable instructions executable by one or more processors, that when executed by the one or more processors, cause the one or more processors to perform operations comprising:

transmitting, by a transmitter of a cellular network system, a first signal in a target direction, the first signal being a communication signal for communicating with a user equipment (UE);

receiving, by a receiver of the cellular network system, a second signal;

determining, by the one or more processors, that the second signal is a reflected signal associated with the first signal;

determining, by the one or more processors and based at least in part on the second signal, topographic data associated with a surrounding area of the cellular network system in the target direction;

receiving, by the receiver, a third signal;

determining, by the one or more processors, that the third signal is from the UE in response to the first signal, the third signal including local topographic data of a local area relative to a location of the UE; and generating, by the one or more processors, an area topographic map of the surrounding area based on the topographic data and by aggregating the topographic data and the local topographic data.

13. The non-transitory computer-readable storage medium of claim 12,
wherein the one or more processors include an edge computing processor remotely located from the transmitter and the receiver, and
wherein generating, by the one or more processors, the area topographic map of the surrounding area includes generating, by the edge processor, the area topographic map of the surrounding area.

14. The non-transitory computer-readable storage medium of claim 12, the operations further comprise:
steering the first signal in the target direction.

15. The non-transitory computer-readable storage medium of claim 12, wherein determining the topographic data includes determining the topographic data based at least in part on a characteristic of the second signal, the characteristic including at least one of:
a signal strength of the second signal,
a phase of the second signal,
an arrival time of the second signal,
a frequency shift of the second signal,
a polarization of the second signal, and
a direction associated with the second signal.

16. The non-transitory computer-readable storage medium of claim 12, wherein the operations further comprise:
transmitting, by the transmitter, the first signal at a plurality of frequencies, and
receiving, by the receiver, the second signal at the plurality of frequencies.

17. The non-transitory computer-readable storage medium of claim 12, wherein aggregating the topographic data and the local topographic data includes aggregating the topographic data and the local topographic data by an edge computing processor.

* * * * *